A. C. G. DREILICK.
FLY TRAP.
APPLICATION FILED DEC. 16, 1916.

1,277,298.

Patented Aug. 27, 1918.
2 SHEETS—SHEET 1.

Inventor
A. C. G. Dreilick
By his Attorney
T. F. Bourne

A. C. G. DREILICK.
FLY TRAP.
APPLICATION FILED DEC. 16, 1916.

1,277,298.

Patented Aug. 27, 1918.
2 SHEETS—SHEET 2.

Inventor
A. C. G. Dreilick
By his Attorney
N. F. Bourne

UNITED STATES PATENT OFFICE.

AXEL C. G. DREILICK, OF GOTTENBORG, SWEDEN, ASSIGNOR TO ERNST J. OHNELL, TRUSTEE.

FLY-TRAP.

1,277,298.      Specification of Letters Patent.      Patented Aug. 27, 1918.

Application filed December 16, 1916. Serial No. 137,310.

*To all whom it may concern:*

Be it known that I, AXEL C. G. DREILICK, a subject of the King of Sweden, and resident of Gottenborg, Sweden, have invented certain new and useful Improvements in Fly-Traps, of which the following is a specification.

The present invention relates to fly traps or fly catchers.

The object of the invention is to provide a simple and novel device for entrapping flies, and the principle involved in the broad invention is in having a movable part to which flies may be attracted and in associating this movable part with a compartment for entrapping the flies, together with suitable means, preferably associated with the movable part, for preventing the escape of the flies after they have been carried within a part of the entrapping inclosure.

I prefer to provide, in connection with the above devices, a removable cage in which the flies ultimately collect, whereby the cage may be detached from the remainder of the device and emptied from time to time.

The movable device is operated by suitable mechanism, a clock-work being indicated as one means of propelling it.

In the drawings forming part of this application—

Figure 1:
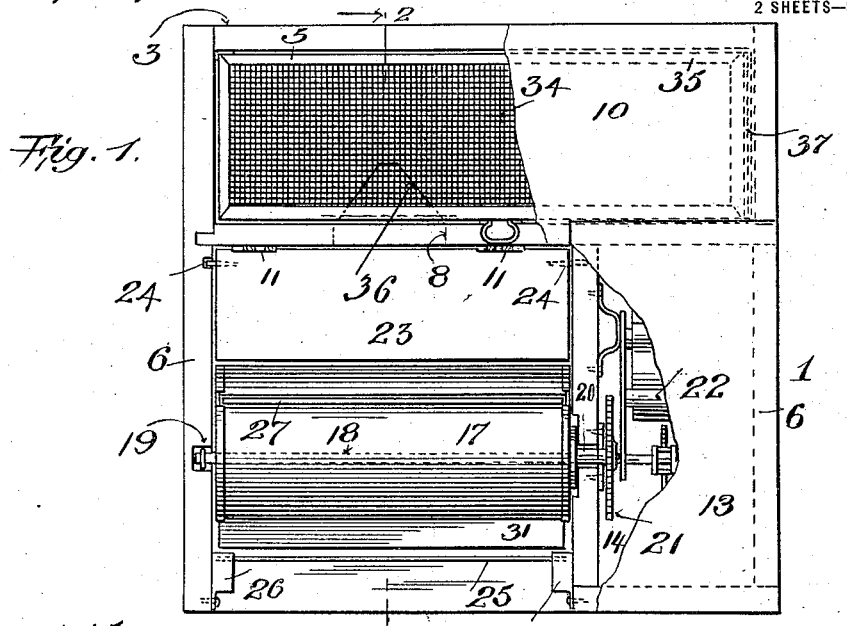
Figure 1 is a plan view of my invention with parts of the casing broken away to show the interior.

The invention may be embodied in almost any form in so far as the closure is concerned, but in the illustrated embodiment of my improvement I have shown a box 1 consisting of a bottom 2, the end wall 3 having an opening 4 which is closed by a transparent window 5, which allows the light to pass to the interior of the box; the side walls 6, a partition 7 having an opening 8 near the bottom; and a partition 9 extending at right angles to the partition 7. I have also shown a cover 10 hinged at 11 and adapted to close the compartment 12. There is a sliding cover 13 which serves the same purpose for the compartment 14. The front wall 15 terminates some distance below the top of the box, and it forms one wall of the compartment 16 with which the trapping device is associated.

As stated above, the trapping device consists of a movable member on which the flies are attracted, and means for entrapping the flies as they are carried with the movable member into a portion of the inclosure. In the construction shown the cylinder 17 forms the movable member referred to and this is mounted upon an axle 18 journaled in the walls 6, 9, and provided with a pin or equivalent device 19 to prevent the shaft from rotating. The cylinder 17 is adapted to rotate upon the shaft 18 and it is provided with a sleeve 20 extending through the wall 9 and having a gear 21 on its free end. This gear, 21, is driven by any suitable propelling device and in the drawing I have indicated clock-work 22 arranged in the compartment 14 and geared to the gear 21. The movement of the clock-work is transmitted through the gear 21 to the cylinder 17 so that the latter will revolve upon its shaft very slowly, the object being to move the cylinder for the purpose of carrying the flies within the inclosure, but not so rapidly as to drive the flies from the cylinder before they have been entrapped.

There is shown a plate 23 supported on pins 24 in the compartment 16, the forward edge of which lies close to but not touching the periphery of the cylinder 17. This plate is intended to prevent any escape of the flies at this point. At the other side of the cylinder I have arranged a curved guard 25, which is preferably transparent and which I prefer to make of celluloid. It is shown held in side clips 26 attached to the walls 6 and 9 respectively.

Figure 2:
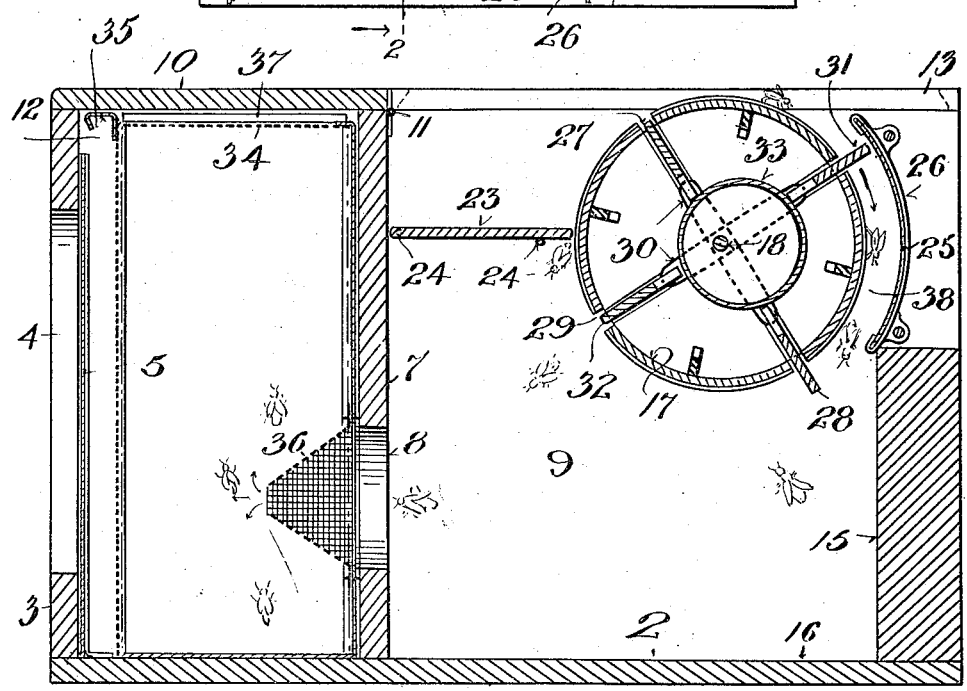
Fig. 2 is a sectional view taken on the line 2, 2, of Fig. 1.
Figure 3:
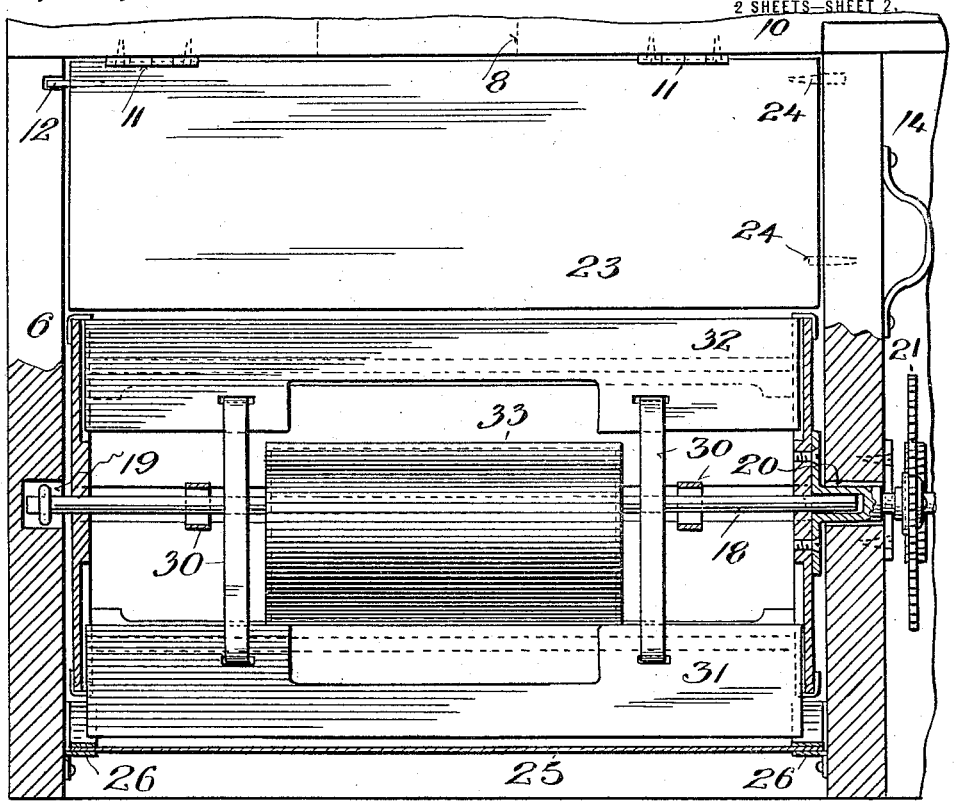
Fig. 3 is an enlarged plan view of a portion of the device with parts of the casing broken away.

In the embodiment shown in Figs. 1 to 3 inclusive the cylinder 17 is provided with movable vanes which are retracted within the cylinder to allow them to pass the plate 23 but which are slowly projected outwardly as they pass this plate in order to be extended sufficiently to coöperate with the guard 25 to entrap the flies. The vanes referred to are indicated at 27, 28, there being four such vanes arranged 90° apart and moving through the slots 29 in the cylinder. Opposite vanes 27, 28 are connected with each other by means of straps 30 which straddle the shaft 18 and form guides for the vanes. This construction is the same for the vanes 31, 32 and the construction is repeated at opposite ends of the vanes. There is mounted on the shaft 18 an eccentric 33, which coöperates with the inner edges of the several vanes as shown in Figs. 2 and 3. The cylinder 17 is revolved by the clock work, but the shaft 18 and its eccentric 33 are stationary, and, therefore, as the cylinder revolves the motion of the vanes may be traced from the plate 23 as follows: The rising vane, say 28, moving upwardly from a point in line with the plate 23, is gradually raised by the stationary eccentric 33 until one edge of the vane projects beyond the periphery of the cylinder, reaching its highest point by the time this particular vane reaches the guard 25. This projecting of the vane 28 simultaneously causes the retraction of its companion vane 27 on the opposite side of the cylinder, so that by the time the vane 28 has been fully projected its companion vane 27 will have been retracted sufficiently to allow it to pass the plate 23. This same action is repeated as to both pairs of vanes at each revolution of the cylinder.

The space between the cylinder 17 and the guard 25 is open into the compartment 16 and the latter compartment opens through the aperture 8 into the compartment 12. The cage for holding the flies is arranged in this compartment 12, and it consists of a rectangular body 34 preferably made of wire mesh and it is provided with a handle 35. It also has a tapering receiving portion 36 which is in line with the aperture 8, the receiving portion extending inwardly within the cage and being provided with an opening at its smaller end. For convenience I have shown a sliding door 37 at one end of the cage which may be opened for cleaning out or emptying the cage.

Any suitable material, such as sugar, may be applied to the periphery of the cylinder 17 for the purpose of attracting the flies. When the flies alight on the revolving cylinder the motion of the latter is slow and steady, and the flies are gradually carried around on the cylinder until they arrive at the space 38 between the guard 25 and the cylinder, whereupon the next succeeding vane closes the space behind such flies as may have gathered on the sector of the cylinder in advance thereof. The object of having the guard 25 transparent is to avoid shadows and to prevent the flies from being driven off before they enter the space 38. Once the flies have been carried within this space they are trapped within the compartment 16 and their only escape is through the opening 8 and the guide 36 into the cage 34. The tendency will be for them to travel in this direction owing to the attraction of the light entering through the window 5. The proximity of the plate 23 to the cylinder 17 prevents the escape of the flies at the rising side of the cylinder.

Figure 4:
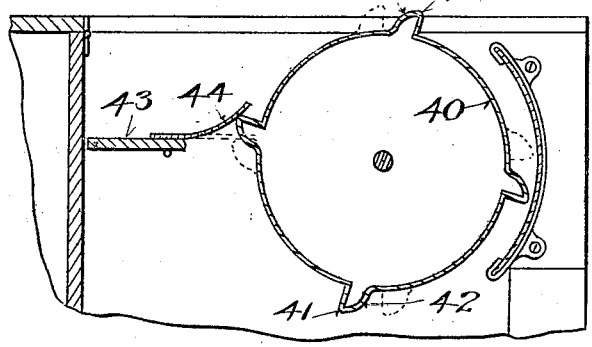
Fig. 4 is a sectional view showing a modified construction of the movable member and the cut-off.
Figure 5:
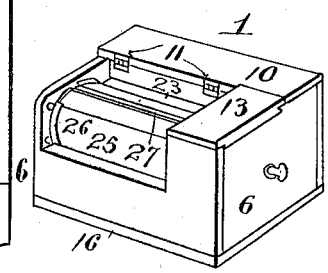
Fig. 5 is a perspective view thereof.

In Figs. 4 and 5 I have shown a modified construction in which the vanes are made stationary in relation to the cylinder, thereby avoiding the use of mechanism for operating the vanes. In this construction the cylinder 40 corresponds with the cylinder 17 in the previous construction, but the vanes 41 are stationary and they may be stamped or formed integral with the cylinder. They are shown as having an inclined surface 42 on one side. The forward edge of the plate 43, in this construction, is spaced apart some distance from the cylinder 40 and there is a flap 44 of flexible material such as leather or canvas attached along the forward edge thereof and lying close to but not touching the periphery of the cylinder. When the cylinder revolves, the vanes 41 gradually lift the free edge of the flap 44 and the latter gradually returns to normal position as the high point of the vane passes its free edge. In this way the space between the flap 44 and the cylinder 40 is never sufficient to permit the flies to escape. The vanes in this construction coöperate with the guard 25 in the same manner and for the same purpose as the vanes in the previous construction and the remainder of the device may be the same as in that construction.

Having now described my invention what I claim is:—

1. In a device of the class described the combination of means for holding insects and means for entrapping them, comprising relatively movable members arranged to form an entrapping space between them, and means movably connected with one of said members and movable toward the other member for closing the entrance portion of said entrapping space whereby when the insects are carried within said entrapping space they will be entrapped by said closing means.

2. In a device of the class described, the combination of means for holding insects and means for entrapping them comprising coöperating members spaced apart to form an entrapping space, at least one of said members being movable, and means traveling with said movable member and movable toward the other member adapted to periodically close said entrapping space whereby when the insects are carried within the entrapping space by said movable member they will be entrapped by said closing means.

3. In a device of the class described the combination of means for holding insects and means for entrapping them, comprising a guard and a revoluble member, said guard and said revoluble member being spaced apart to form an entrapping space, movable vanes on said revolving member for periodically closing said entrapping space, and means coöperative with said vanes for moving them without and within said revoluble member whereby when the insects are carried within said space by the revoluble member they will be entrapped by said closing means.

4. In a device of the class described the combination of means for holding insects and means for entrapping them, comprising a curved substantially transparent guard, a revolving cylinder spaced from said guard to form an entrapping space, and a plurality of projections on said cylinder rotative therewith and movable transversely thereof for periodically closing said entrapping space for the purpose set forth.

5. In a device of the class described the combination of a receptacle having a compartment for receiving insects, a curved guard, a revolving cylinder spaced from said guard to form an entrapping space opening into said compartment, vanes on said cylinder, means coöperating with the cylinder to form an exit closure, and means for retracting said vanes into the cylinder to allow them to pass said exit closing means and for projecting said vanes beyond the cylinder to cause them to periodically close said entrapping space.

6. In a device of the class described, the combination of a receptacle having an insect receiving compartment, a guard, a revoluble cylinder spaced from the guard to form an entrapping space opening into said compartment, vanes for periodically closing said entrapping space, said vanes being movable laterally of said cylinder, and an eccentric coöperative with said vanes to operate them during rotation of said cylinder.

7. In a device of the class described the combination of a receptacle having an insect receiving compartment, trapping means comprising a rotative member and a guard spaced apart to form an entrapping space opening into said compartment, said member having radial openings, vanes operative in said openings, an eccentric within said member coöperative with said vanes, means to cause opposing vanes to project from and enter said member respectively, a plate opposing said member opposite the guard, and means to rotate said member.

Signed at New York city, in the county of New York and State of New York, this 8th day of December, A. D. 1916.

AXEL C. G. DREILICK.

Copies of this patent may be obtained for five cents each, by addressing the "Commissioner of Patents, Washington, D. C."